Sept. 2, 1969     E. F. BRUNING     3,464,436
SELF-CLEANING FLUID COUPLING
Filed Sept. 5, 1967     2 Sheets-Sheet 1
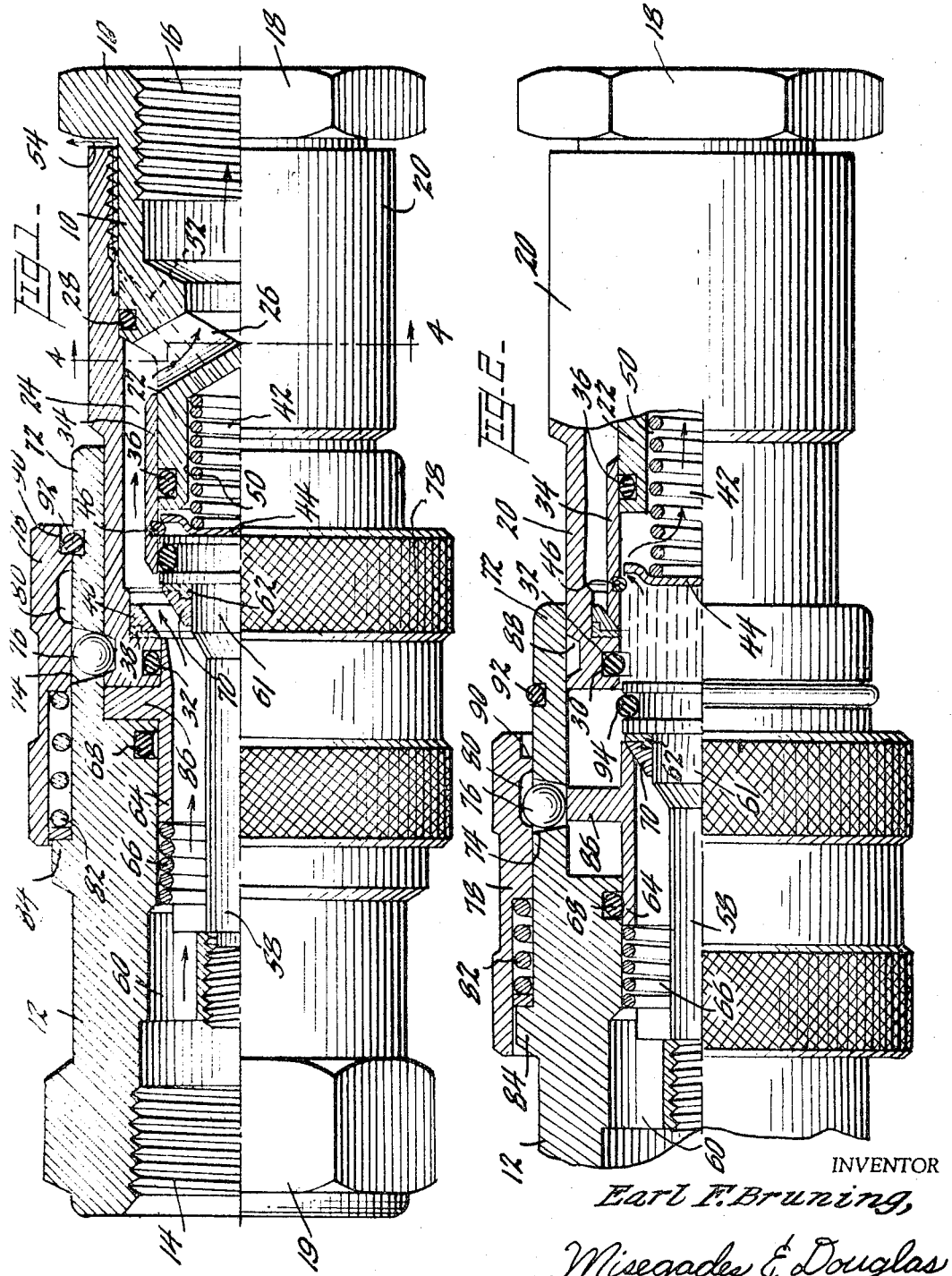
INVENTOR
*Earl F. Bruning,*
BY *Misegades & Douglas*
*Keith Misegades* ATTORNEYS Sept. 2, 1969  E. F. BRUNING  3,464,436
SELF-CLEANING FLUID COUPLING
Filed Sept. 5, 1967  2 Sheets-Sheet 2
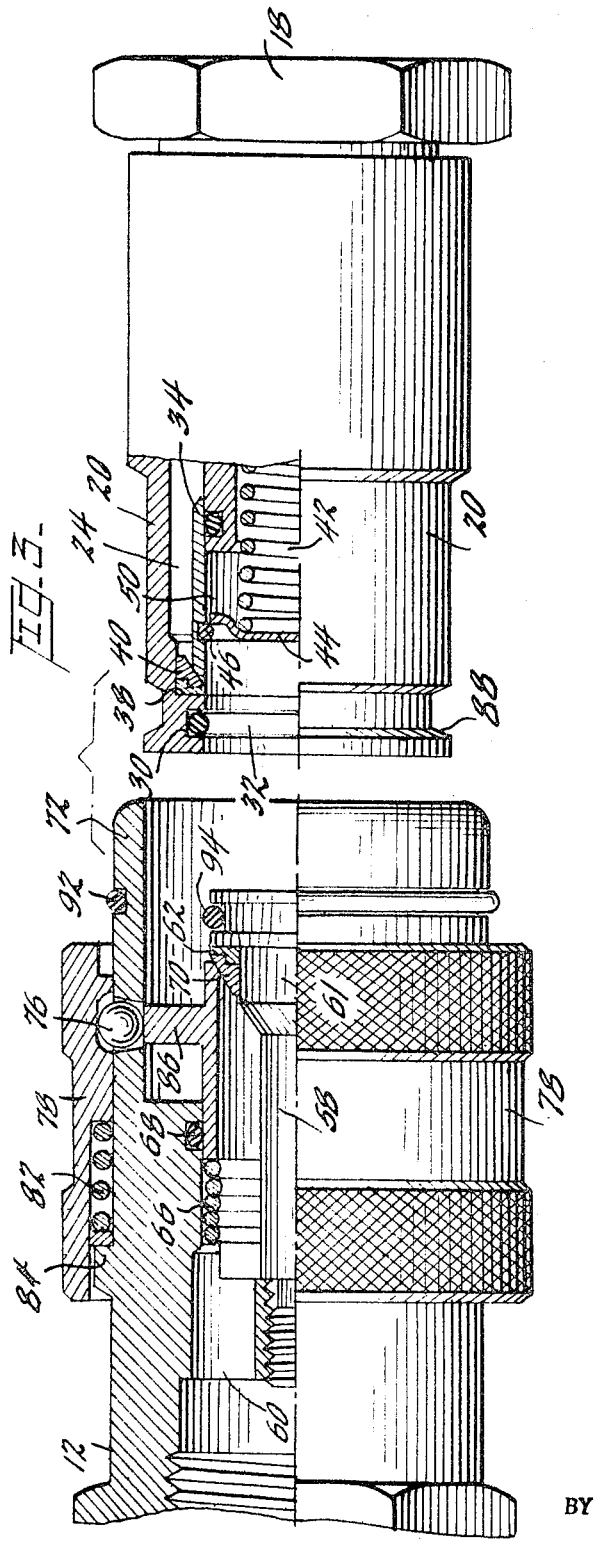
INVENTOR
Earl F. Bruning,
BY Misegades & Douglas
Keith Misegades ATTORNEYS United States Patent Office 3,464,436
Patented Sept. 2, 1969

3,464,436
SELF-CLEANING FLUID COUPLING
Earl F. Bruning, P.O. Box 147, Lincoln, Nebr. 68501
Filed Sept. 5, 1967, Ser. No. 665,353
Int. Cl. F16k 3/36; F16l 29/00
U.S. Cl. 137—237                                8 Claims

ABSTRACT OF THE DISCLOSURE

A coupling comprising male and female coupling elements each containing a valve. A bleed disc located in a chamber communicating with the atmosphere and cooperating with a female piston to provide for the purging of contaminants from between the coupling elements. The contaminants are conducted to a chamber formed in the reduced tubular end in the male member which is provided with a bleed disc at the outer end thereof, normally spring urged to a closed position. The chamber serves as a volumetric displacement compensating cavity for overcoming static head pressure in the male and female members when they are coupled; and it is bled to the atmosphere through the junction of the tubular body and the nozzle of the male member for scavenging entrained air and contaminants.

BACKGROUND OF THE INVENTION

Generally, the invention relates to fluid or hydraulic couplings of the quick connect type and particularly presents a solution to the problem of coupling or uncoupling fluid lines having high static pressures locked in one or both sides of the hydraulic system while minimizing external fluid spillage. Additionally, the invention includes a self-cleaning and environmental contaminant purging system which prevents the possible entry of undesirable material into the pressure fluid. Additionally, the invention includes a self-cocked locking sleeve having completely encased working parts automatically released to lock male and female members of the coupling together upon the mere insertion of one of the members into the other.

Several attempts have been made to overcome the problems set forth above, with only partial success. For example, U.S. Patent No. 2,854,258 issued to C. D. Hickey et al. illustrates a fluid coupling having a male nozzle with an internally mounted seal which serves to close the connected coupling to atmosphere prior to opening of the internal fluid valves of the system. Additionally, relief chambers are provided to overcome static pressure. U.S. Patent No. 3,195,935 issued to F. L. Beebee indicates a fluid coupling having an automatically actuated locking sleeve which moves into a coupling position upon insertion of one member of the coupling into the other by means of spring loaded keys. Finally U.S. Patent No. 3,205,911 issued to G. E. Swick, Jr. indicates a fluid coupling having a fixed piston and sleeve valve in the female member and a flat valve head in the male member whereby the possibility of air inclusion in the fluid coupling is reduced, but no provision is made for cleaning the face areas of the coupling of possible accumulated debris.

The instant invention overcomes the aforementioned disadvantages of the prior art by providing an automatically actuated locking sleeve for a fluid coupling as well as an internal static piston in the female half of the coupling which has a wiper element on the head thereof which serves to clean the system of environmental contaminants during a coupling operation, the male half of the coupling being provided with an internal chamber which serves to overcome static pressure in the fluid line and which serves as a waste chamber for debris collected by the piston head of the female coupling element. The chamber includes a bleed line exteriorly of the coupling for evacuation of such contaminants.

SUMMARY

The coupling of the invention comprises male and female coupling elements. The male member includes a tubular body, a nozzle extension mounted on the body, the body having a reduced forward tubular portion which, in combination with the interior walls of the nozzle, defines an annular fluid conducting chamber. A sleeve valve is mounted on the end of the reduced tubular section and defines a valve interface with the internal circumferential edge of the nozzle. Internally of the reduced tubular end is defined a compensating and waste chamber, capped by a bleed disc, normally urged to a closed position within the sleeve valve but is of slightly reduced diameter with respect to the sleeve valve to allow entry of contaminants therearound and into the waste and compensating chamber. The female half of the coupling includes an outer tubular body with a piston concentrically mounted therein to define an annular fluid conducting chamber between the piston and the interior walls of the female tubular body. A female sleeve valve is provided between the piston head and the interior wall of the female tubular body. A circular wiping and sealing element is mounted on the head of the piston serving to clean the interior cylindrical side walls of the male sleeve wall upon coupling of the members. A skirt is defined in the forward leading edge of the female member and includes a series of lateral ports having locking balls inserted therein. About the skirt is mounted a spring loaded lock sleeve having an annular groove therein for receiving the locking balls when the lock sleeve is in a cocked position. The nozzle of the male member is provided with an external annular groove for receiving the locking balls when the coupling is in a coupled position. In view of the fact that the invention is provided with a pair of sleeve valves, whose sealing diameters are nearly identical the amount of volumetric displacement in the system mainstream can be compensated for by the compensating and waste chamber. Thus, for example, when the hydraulic system is loaded with a static pressure load of 3,000 p.s.i., a manual thrust of only approximately 60 pounds is required for coupling.

BRIEF DESCRIPTION OF THE DRAWINGS

Details of construction and operation of a preferred embodiment of the invention will become readily apparent by reference to the following drawings wherein:

FIGURE 1 is a side elevational view of the invention, partly in section, showing the invention in coupled relation;

FIGURE 2 is a partial, elevational view, similar to FIGURE 1 but showing parts in the initial stage of coupling and showing the action of the bleed disc and waste and compensating chamber.

FIGURE 3 is another side, elevational view, similar to FIGURE 1, but showing parts in an uncoupled position; and FIGURE 4 is a sectional view taken along lines 4—4 of FIGURE 1.

DESCRIPTION OF THE PREFERRED EMBODIMENT

Referring now to the drawings by reference character, the main tubular body of the male element is designated by numeral 10 and the main tubular body of the female member of the coupling is shown at 12. Body 12 is internally threaded at 14 to receive a fluid supply line (not shown); in like manner, male body 10 is internally threaded at 16 to receive the line to which fluid is directed. Bodies 10 and 12 are provided with hexagonal nut portions 18 and 19, respectively, to facilitate mounting and removal on the respective fluid lines, obviously the flow direction indicated by the arrows in FIGURE 1 could be reversed, or there could be neutral flow, with both bodies 10 and 12 pressurized.

Tubular body 10 is externally threaded adjacent hexagonal nut portion 18 to receive a tubular sleeve or nozzle 20. Body 10 has a reduced, inwardly extending tube portion 22 which is formed concentrically within nozzle 20 so as to form an annular fluid conduit 24. Fluid communication to conduit 24 is provided by a series of slanted, radially spaced ports 26 (FIGURE 4) about the junction of tubular body 10 and reduced tube portion 22. Since body 10 and nozzle 20 form a part of a fluid chamber, they are provided with a suitable fluid confining gasket 28 near the forward terminal end of tubular body 10. At its outer end, nozzle 20 has a wall section of increased thickness providing an aperture of reduced diameter. An inner, annular channel 30 is formed therein to receive a sealing gasket 32.

Reduced portion 22 is adapted to be snugly received in a sliding sleeve valve 34, which, being adjacent the terminal end of annular fluid conduit 24, is sealed against the tube portion 22 by a suitable O-ring or sealing member 36, and is sealed against the inner end of the aperture of nozzle 20 by a circular gasket 38 when the parts are in uncoupled relation. The forward, terminal circumferential edge of sleeve 34 is chambered to avoid a slant faced valve gasket retaining ring 40 which is mounted against gasket 38 whereby a valve interface between nozzle 20 and gasket 38 is formed. The slant of the valve interface permits a substantial sealing compression as well as minimizing full fluid flow at an early stage of cracking open the valve interface.

Sleeve 34 is normally urged outwardly by a coil spring 42 mounted within the counterbore of reduced portion 22 by acting against a novel bleed disc 44 retained in sleeve 34 by a lock ring 46 mounted within the internal wall of sleeve valve 34. Thus, disc 44, sleeve 34, and the counterbore of tube portion 22 define a compensating or waste chamber 50 which is bled to atmosphere by a vent line 52 as shown in FIGURES 1 and 4. Line 52 terminates at the edge of the threaded union of body 10 and nozzle 20, at 54 (FIGURE 1).

Body 12 includes a reduced inner portion, threaded to rigidly mount an inner piston 58, which has a cooperating outer threaded portion. A series of axially disposed, radially spaced ports 60 are formed in the inner portion of body 12, about the threaded mounting of piston 58 to permit free flow of fluid under pressure about piston 58.

Piston 58 is of increased diameter at its free end 61 opposite the threaded mounting end to provide a shoulder for mounting an annular gasket 62. An intermediate sleeve valve 64 is snugly received for axial sliding movement within the counter bore of female tubular body 12, and is normally urged outwardly against gasket 62 by a coil spring 66. Thus a chamber for fluid under pressure is formed by the interior of tubular body 12, the outer cylindrical surface of piston 58, and by the inner circumferential face of intermediate sleeve 64. An O-ring or fluid seal 68 is provided between body 12 and sleeve 64. As in the case of sleeve 34, the inner terminal edge of sleeve 64 is chamfered to avoid a slant faced valve gasket retaining ring 70 mounted against gasket 62 about end 61 of piston 58.

The forward terminal end of body 12 is counterbored to an increased diameter to the exterior diameter of nozzle 20, to form an outer lock skirt 72. A series of radially disposed, slant-sided ports 74 are formed thereabout, each accommodating a lock ball 76. A locking sleeve 78 is mounted about skirt 72 and has an inner, annular groove 80 formed therein to receive locking balls 76 in the retracted position of sleeve 78 as illustrated in FIGURE 3. In this position, the sleeve is held against the pressure of an inner, cocking coil spring 82 retained between a radial shoulder 84 formed in body 12 and a shoulder formed interiorly of sleeve 78. In this cocked position, the balls are retained in groove 80 by a radial keeper flange 86 formed about the exterior of intermediate sleeve 64. It will be seen that as nozzle 20 is inserted into female body 12, movement of the keeper flange 86 will be started by contact of the forward edge of nozzle 20 thereagainst, movement continuing until balls 76 have been moved off flange 86 onto nozzle 20. When the balls reach the annular channel 88 formed about nozzle 20, they are wedged into channel 88 by the slant walls of groove 80 under compression force of cocking spring 82. Locking sleeve 78 continues its forward movement until its inner cylindrical wall overlies balls 76, thereby locking the male and female members together, movement of locking sleeve 78 being terminated by an interior annular shoulder 90 coming in contact with an annular stop ring 92, mounted on the exterior of skirt 72, as illustrated in FIGURE 1.

With the coupler thus joined together, balls 76 are free to move in channel 88 and thus parts are free to rotate relative to each other so as to compensate for twisting action in the fluid lines. Separation of the coupling is easily accomplished by simple axial movement of sleeve 78 away from the male unit so as to compress spring 82, reversing the process so that groove 80 is brought into position to receive balls 76 which are cammed thereinto by the forward slant wall of channel 88 in nozzle 20. Thus the coupling may be securely locked together without any manual manipulation of locking sleeve 78, by mere insertion of the male portion of the coupling into the female member, whereby sleeve 78 is activated by urging of nozzle 20 against keeper flange 86. Withdrawal is effected by a simple sliding action of sleeve 78 away from the male member of the coupling.

Novelty resides in the unique action of piston 58 cooperating with bleed disc 44 as the coupling elements are joined together, in that absorption of volumetric displacement of fluid under pressure in the uncoupled system is provided and any entrained air and environmental contaminants residing in the nose pieces of the coupling elements as they are joined together are purged from the system, without entering the conveyed fluid, through compensating chamber 50 to vent port 54 in the male half of the coupling. For purging purposes, end 61 of piston 58 has an annular groove formed therein to receive an annular wiper and sealing ring 94 which cleans the assembly of contaminants as the coupling elements are joined together.

Upon initial axial insertion of the male half of the coupling into the female half, as indicated by FIGURE 2, initial contact is made between nozzle 20 and skirt 72, following which head 61 of piston 58 approaches the inner circumferential edge of nozzle 20. Next, wiper ring 94 comes in contact with the mouth of nozzle 20 and begins to sweep debris and excess fluid toward bleed disc 44 in the male coupling member. If the space between piston 58 and disc 44, forming the chamber including the interior cylindrical wall of sleeve 34, contains fluid or debris the fluid and debris, as well as any entrained air, may escape about the edges of the disc and lock ring 46 into compensating chamber 50, which when filled, is bled to the atmosphere through bleed line 52 and port 54. Thus excess valve head pressure is compensated while the interior of nozzle 20 is cleaned to prevent contamination of line fluid.

After this, piston 58 proceeds inwardly until the outer rim of end 61 comes in contact with lock ring 46 within sleeve 34, thereby causing compression of spring 42. At this time, end 61 will be in face to face contact with disc 44. Thus, the entire system is interiorly sealed and purged prior to initial cracking the male or female sleeve valves.

Immediately thereafter, cracking of the male sleeve valve occurs by axial movement of sleeve 34 away from gasket 38 by further urging of end 61 of female piston 58 against lock ring 46. Then, cracking of the female sleeve is caused by axial movement of nozzle 20 into contact with keeper flange 86, which causes compression of spring 66. In turn, this causes unseating of valve sleeve 64 from gasket 62. The position of the fully open coupling is illustrated in FIGURE 1.

It is apparent from the foregoing that I have invented a new high static pressure fluid coupling with novel connective air and contaminant scavenging features, and thus I am not to be limited to the exact embodiment as hereinbefore provided except as may be deemed to be within the scope of the following claims.

I claim:
1. A coupling device for fluid lines comprising male and female elements, the male element having two concentric tubular walls defining a first fluid conducting annular cavity, the inner wall having lateral fluid ports, connecting the interior of the inner tube with said cavity, the outer wall having a free nozzle end, a first sleeve valve urged to a position closing said first annular cavity when the elements are uncoupled and disposed between said nozzle end and the inner wall, a valve interface formed between said nozzle end and said sleeve valve, a contaminant and air compensating chamber formed interiorly of said inner wall and vented to the atmosphere, a bleed disc mounted inwardly of said sleeve valve, and within said chamber and first means on said first sleeve valve, actuated by the female element for opening thereof, a female element comprising an outer tubular wall, a fixed piston concentrically arranged internally of said tubular wall, said piston and tubular wall defining a second fluid conducting annular cavity, a skirt defined about the free forward end of said piston, having an internal diameter somewhat greater than the external diameter of said male member nozzle, a second sleeve valve urged to a position closing said second annular cavity when the elements are uncoupled and disposed between said free piston end and said tubular wall, inwardly of said skirt, a second valve interface formed between said second sleeve valve and free piston end, and second means on said second sleeve valve actuated by said male member nozzle to open said valve, the parts being arranged so that, upon axial approach of said male and female members said free piston end enters said nozzle forcing entrained air and contaminants in the coupling about the lateral edge of said bleed disc into said compensating chamber whereafter said first sleeve valve is opened by urging of said piston against said first actuated means, and said second sleeve valve is opened by urging of said nozzle against said second actuated means and means securing said male and female members together all when said coupling device is in a coupled, fluid-conducting position.

2. The coupler of claim 1 wherein the lateral fluid ports of the inner tubular wall of said male member are radially spaced, means defining a vent line for said compensating chamber to the atmosphere located through said inner tubular wall therebetween.

3. The coupler of claim 1 wherein said first actuated means on the first sleeve valve for opening thereof comprises an annular lock ring having an internal diameter less than the external diameter of the free piston end of the female member whereby said first sleeve valve is urged to an open position by said free piston end.

4. The coupler of claim 3 wherein said bleed disc is provided with spring means urging said disc to a closed position against the interior circumferential face of said annular lock ring.

5. The coupler of claim 1 wherein said second actuated means on second sleeve valve comprises a radial flange, formed on the exterior cylindrical surface of said second sleeve valve, arranged for face-to-face contact with the free end of said nozzle.

6. The coupler of claim 1 wherein said free piston end has means defining an annular channel therearound, and an annular wiper ring secured in said annular channel, having an exterior circumference corresponding to the interior circumference of said male member nozzle whereby, upon the joining of said female and male members, entrained fluid and debris in said male nozzle is forced against and about said bleed disc.

7. The coupler of claim 1 wherein said means for securing said male and female members together comprises a self-cocking lock sleeve slidably mounted on the skirt of the outer tubular wall of said female element, spring means between said lock sleeve and tubular wall urging the lock sleeve to a coupled position, said skirt of the female member having lateral ports, and locking balls in said ports, the lock sleeve having an annular groove formed internally thereof, arranged to receive the locking balls, a keeper flange formed on said second sleeve valve for retaining the balls in the annular groove of the lock sleeve thereby retaining the lock sleeve in an uncoupled position against urging of the spring means, an annular groove formed about the periphery of said nozzle and arranged to receive the balls when the lock sleeve is in a coupled position, and means limiting axial movement of the lock sleeve in a coupled position.

8. The coupler of claim 7 wherein said means limiting axial movement of the lock sleeve comprises a retainer ring, formed on the forward end of the skirt, and a circular shoulder formed in the forward end of said lock sleeve.

References Cited
UNITED STATES PATENTS 3,000,655  9/1961  Piet _____ 137—614.04

WILLIAM F. O'DEA, Primary Examiner

H. M. COHEN, Assistant Examiner

U.S. Cl. X.R.

251—149.1; 137—614.03